United States Patent
Kovanen et al.

(10) Patent No.: US 10,693,391 B2
(45) Date of Patent: Jun. 23, 2020

(54) METHOD FOR OPERATING INVERTER AND INVERTER

(71) Applicant: ABB Schweiz AG, Baden (CH)

(72) Inventors: Kari Kovanen, Espoo (FI); Hannu Haapaniemi, Kellokoski (FI); Marko Harju, Helsinki (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/032,599

(22) Filed: Jul. 11, 2018

(65) Prior Publication Data
US 2019/0020286 A1    Jan. 17, 2019

(30) Foreign Application Priority Data

Jul. 11, 2017 (EP) .................................... 17180643

(51) Int. Cl.
*H02M 7/537* (2006.01)
*H02M 7/48* (2007.01)
(Continued)

(52) U.S. Cl.
CPC .............. *H02M 7/537* (2013.01); *G05F 1/67* (2013.01); *H02J 3/383* (2013.01); *H02M 7/48* (2013.01);
(Continued)

(58) Field of Classification Search
CPC .. H02M 2001/0009; H02M 7/44; H02M 7/48; H02M 7/537; G05F 1/66; G05F 1/67
See application file for complete search history.

(56) References Cited

U.S. PATENT DOCUMENTS 5,548,199 A * 8/1996 Bidaud ............... H02M 1/4225
                                                              318/802
6,326,758 B1 * 12/2001 Discenzo ........... G05B 23/0243
                                                              318/432
(Continued)

FOREIGN PATENT DOCUMENTS

CN    103603958 A    2/2014
CN    106849153 A    6/2017
(Continued)

OTHER PUBLICATIONS

European Patent Office, Search Report issued in corresponding Application No. 17180643.3, dated Jan. 12, 2018, 4 pp.
(Continued)

*Primary Examiner* — Nguyen Tran
*Assistant Examiner* — David A. Singh
(74) *Attorney, Agent, or Firm* — Taft Stettinius & Hollister LLP; J. Bruce Schelkopf

(57) ABSTRACT

A method for operating an inverter and an inverter configured to convert DC power supplied from a DC power source into AC power supplied to an AC network by applying operational parameter limits which define limits for allowed operating points of the inverter, collect, during the converting, data of operational conditions related to the inverter, determine on the basis of the collected data whether the set operational parameter limits can be optimized with regard to one or more optimization criteria, and in response to determining that the set operational parameter limits can be optimized, adapt one or more of the set operational parameter limits applied in the converting on the basis of the collected data.

16 Claims, 3 Drawing Sheets

(51) Int. Cl.
*G05F 1/66* (2006.01)
*H02J 3/38* (2006.01)
*H02S 40/32* (2014.01)
*G05F 1/67* (2006.01)
*H02M 1/00* (2006.01)

(52) U.S. Cl.
CPC ............ *H02S 40/32* (2014.12); *G05F 1/66* (2013.01); *H02M 2001/0009* (2013.01); *H02M 2007/4803* (2013.01)

(56) References Cited

U.S. PATENT DOCUMENTS

| | | | |
|---|---|---|---|
| 7,301,296 B1 * | 11/2007 | Discenzo | G05B 19/4063 318/400.01 |
| 9,819,188 B1 * | 11/2017 | Pan | H02J 3/36 |
| 2009/0204245 A1 * | 8/2009 | Sustaeta | G05B 13/024 700/99 |
| 2009/0204267 A1 * | 8/2009 | Sustaeta | G05B 13/0285 700/291 |
| 2010/0091528 A1 * | 4/2010 | Radbrandt | H02J 3/36 363/35 |
| 2011/0205763 A1 * | 8/2011 | Artusi | H02M 1/4225 363/21.06 |
| 2014/0277814 A1 * | 9/2014 | Hall | H02J 3/14 700/298 |
| 2015/0112496 A1 * | 4/2015 | Fisher | H02J 3/16 700/291 |
| 2015/0295498 A1 * | 10/2015 | Crane | H02M 3/33507 363/21.01 |
| 2015/0311718 A1 * | 10/2015 | Divan | H02J 3/18 323/208 |
| 2017/0126011 A1 * | 5/2017 | Jussila | H02J 3/385 |
| 2017/0331293 A1 * | 11/2017 | Narla | H02J 3/383 |
| 2018/0173256 A1 * | 6/2018 | Dauzat | G05F 1/66 |

FOREIGN PATENT DOCUMENTS

| | | |
|---|---|---|
| EP | 3163730 A1 | 5/2017 |
| WO | 03044939 A1 | 5/2003 |

OTHER PUBLICATIONS

Chinese Patent Office, First Office Action issued in corresponding Chinese application No. 201810745048.3, dated Dec. 24, 2019, 11 pp.

Chinese Patent Office, Search Report issued in corresponding Chinese application No. 201810745048.3, dated Dec. 16, 2019, 4 pp.

* cited by examiner

METHOD FOR OPERATING INVERTER AND INVERTER

FIELD OF THE INVENTION

The invention relates to a method for operating an inverter, and to an inverter.

BACKGROUND OF THE INVENTION

An inverter is an electrical device enabling conversion of DC (direct current) power from a DC power source to AC (alternating current) power. Herein 'inverter' generally refers to an electronic device or circuitry that is able to convert direct current to alternating current. An example of the inverter is a semiconductor bridge implemented by means of controllable semiconductor switches, such as IGBTs (Insulated-gate Bipolar Transistor) or FETs (Field-Effect Transistor), which are controlled according to a modulation or control scheme used.

One example of an electric system comprising an inverter is a photovoltaic system, such as a photovoltaic power plant or generator, in which one or more photovoltaic panels supply DC power to the inverter which converts the DC power to AC power, which may further be supplied to various AC loads via an AC network, for example. Large photovoltaic power plants may comprise a plurality of parallel inverters each receiving DC power from an array of photovoltaic panels. The inverter used may be a single-stage inverter or a multi-stage inverter. A single-stage inverter comprises only a single power electronic stage between the input and the output of the inverter taking care of not only the DC to AC conversion but also the possible maximum power point tracking, MPPT, and/or boosting functionality. An example of a multi-stage inverter is a two-stage inverter comprising a DC to DC stage and a separate DC to AC stage, wherein the DC to AC stage may perform the DC to AC conversion and the DC to DC stage may perform the possible MPPT and/or boosting functionality.

Inverters for such photovoltaic or other applications may be dimensioned and produced according to certain voltage, power etc. ratings. This dimensioning of the inverter typically defines allowed operation points for the inverter. In practice, the inverter may comprise certain set operational parameter limits which define limits for allowed operating points of the inverter. Such predetermined limitations may be based on expected worst case operational conditions in order to guarantee a certain minimum estimated lifetime for the inverter, for instance.

A problem related to the above solution is that the operation of the inverter might be far from optimal e.g. in case the actual operational conditions deviate essentially from the operational conditions used as a basis for the dimensioning of the inverter.

BRIEF DESCRIPTION OF THE INVENTION

The object of the invention is thus to provide a method and an apparatus for implementing the method so as to solve or at least alleviate the above problem or at least to provide an alternative solution. The object of the invention is achieved with a method, a computer program product, an inverter and an electric system that are characterized by what is stated in the independent claims. Preferred embodiments of the invention are described in the dependent claims.

The invention is based on the idea of collecting, during the use of the inverter, data of operational conditions related to the inverter, and in response to determining that set operational parameter limits applied can be optimized, adapting one or more of the set operational parameter limits on the basis of the collected data.

An advantage of the solution of the invention is that the operation of the inverter can be better optimized for the prevailing operational conditions of the inverter.

BRIEF DESCRIPTION OF THE FIGURES

In the following, the invention will be described in more detail in connection with preferred embodiments and with reference to the accompanying drawings, in which.

DETAILED DESCRIPTION OF THE INVENTION

The application of the invention is not limited to any specific system, but it can be used in connection with various electric systems. Moreover, the use of the invention is not limited to systems employing any specific fundamental frequency or any specific voltage level, for example.

Figure 1:
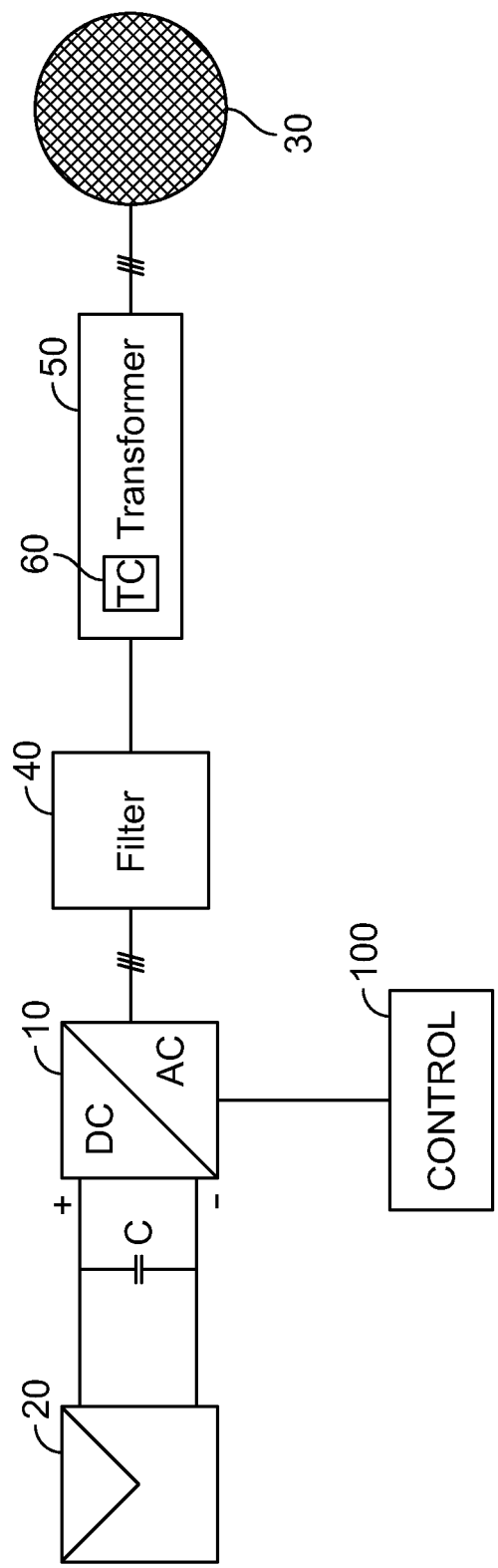
FIG. 1 illustrates an example of an electric system according to an embodiment.

FIG. 1 illustrates a simplified example of an electric system. The figure shows only components necessary for understanding the invention. The exemplary system of FIG. 1 comprises an inverter 10. The inverter 10 may be a single-stage inverter or a multistage inverter comprising two or more converter stages. A DC input of the inverter 10 may be connected to a DC power source 20 as illustrated. An example of a DC power source 20 is a photovoltaic (PV) panel or an array of two or more photovoltaic panels. Other type(s) of DC power source(s) could also be utilized such as a wind power DC power source or a fuel cell DC power source. There may be one or more switches (not shown) between the inverter 10 and the DC power source 20 enabling the connection and disconnection of the inverter to/from the DC power source. The exemplary system of FIG. 1 further shows a capacitance C connected between the (positive + and negative −) poles of the DC input of the inverter 10. Further, an AC output of the inverter 10 may be connected to an AC network 30, such as a public electrical grid or another kind of AC network, in order to supply power from the DC power source 20 to the AC network 30, when the electric system is in normal operation. There may be one or more switches (not shown) between the electric system and the AC network 30, enabling the connection and disconnection of the electric system to/from the AC network 30. The AC connection between the inverter 10 and the AC network 30 may be a one-phase AC connection or a three-phase AC connection as illustrated, for example. The exemplary system of FIG. 1 further shows an AC output filter 40 connected to the AC output of the inverter 10. The AC output filter 40 may be an LCL-filter, for example. There could also be one or more transformers or converters 50 connected between the AC output of the inverter 10 and the AC network 30, for example.

The exemplary system of FIG. 1 further comprises a control arrangement for the inverter 10, which exemplary control arrangement comprises a control unit 100. There could be more than one such control units in the control arrangement. While this exemplary control unit has been illustrated as a separate unit, it could be included within the inverter 10. The functionality according to the various embodiments described herein may be implemented at least partly by means of the control unit 100 for the inverter 10. Moreover, the control unit 100 may further control the normal operation of the inverter 10 according to a modulation scheme used, for example.

According to an embodiment, the inverter 10 may be operated such that DC power supplied from the DC power source 20 to the DC input of the inverter 10 is converted with the inverter into AC power supplied from the AC output of the inverter to the AC network 30 by applying set operational parameter limits which define limits for allowed operating points of the inverter. During the converting, data of operational conditions related to the inverter 10 is collected. On the basis of the collected data it may be determined whether the set operational parameter limits can be optimized with regard to one or more optimization criteria, and in response to determining that the set operational parameter limits can be optimized, one or more of the set operational parameter limits applied in the converting are adapted on the basis of the collected data. After the possible adaptation, the conversion of DC power into AC power may then continue by applying the set operational parameter limits some or all of which have been thus adapted. If, however, it is determined that the set operational parameter limits cannot be optimized, then the conversion of DC power into AC power may continue by applying the set operational parameter limits without the adapting thereof. According to an embodiment, said determining may be performed at predetermined time intervals. The length of such predetermined time intervals may be one or more seconds, or fractions thereof, minutes, hours, days, weeks, months or years, depending on the system, for example. It is also possible to perform the determining in connection with a start-up of the inverter 10, for instance. According to an embodiment, alternatively or additionally the determining may be performed in response to one or more of the operational conditions related to the inverter changing beyond predetermined limits. Accordingly, one or more of such operational conditions related to the inverter may be monitored or checked periodically in order to detect, if the one or more of such operational conditions, e.g. the values thereof, change beyond certain predetermined limits. Such monitoring and/or periodical checking may take place when the inverter 10 is in operation, i.e. during the converting of DC power into AC power, and/or when the inverter 10 is not in operation, for example. Moreover, according to an embodiment, alternatively or additionally the determining may be performed in response to receiving a command. Such a command to perform the determining received in the entity performing the determining and possible subsequent adapting, such as the control unit 100 for the inverter 10, may be sent from a user or an operator of the system or from a higher level control system which may be remote from the inverter 10, for example.

According to an embodiment, the operational parameters may comprise at least one voltage parameter and/or at least one current parameter and/or at least one power parameter and/or at least one temperature parameter. Some possible examples of such operational parameters include an output voltage $U_{ac}$ of the inverter, an output current $I_{ac}$ of the inverter, an output power $P_{ac}$ of the inverter, an input voltage $U_{dc}$ of the inverter, an input current $I_{dc}$ of the inverter, an input power $P_{dc}$ of the inverter, a temperature $T_{inv}$ of the inverter, for example. The operational parameter limits applied in the converting may then generally refer to set limits, such as limit values, for the operational parameters. Consequently, the set operational parameter limits can define limits for allowed operating points of the inverter 10. According to an embodiment, the operational conditions related to the inverter may comprise at least one internal condition of the inverter and/or at least one external condition of the inverter. Such operational conditions related to the inverter may comprise electrical conditions, such as voltage, current or power conditions of the inverter 10 or another entity connected thereto, such as the DC power source 20, the AC output filter 40 or the AC network 30. Such operational conditions related to the inverter may further comprise other physical conditions of the inverter or ambient thereto, such as temperature, wind or irradiation conditions, for example. According to an embodiment, the collecting of the data of the operational conditions related to the inverter may comprise measuring the data and/or receiving the data. Consequently, the control unit 100 for the inverter 10 or another entity performing the functionality of the various embodiments described herein may perform measurements of the applicable operational conditions related to the inverter 10. For this purpose the control unit 100 for the inverter 10 may comprise or be connected to a suitable measuring equipment. Alternatively or additionally the control unit 100 for the inverter 10 may receive data of the applicable operational conditions related to the inverter 10 from other units or systems. The collected data of the operational conditions related to the inverter 10 may be stored in a memory which may be located in the control unit 100 or connected thereto, for example.

According to an embodiment, the one or more optimization criteria may comprise an estimated lifetime of the inverter or a part thereof, an efficiency of the inverter, a power output of the inverter and/or an energy output of the inverter, for example. If several optimization criteria are used, then one or some of them may be prioritized or weighted in a suitable manner. As an example, the adapting of the one or more of the set operational parameter limits applied in the converting may comprise redetermining the one or more of the operational parameter limits applied in the converting on the basis of the collected data such that the operational parameter limits are optimized with regard to the one or more optimization criteria. For example, the adapting of the one or more of the set operational parameter limits applied in the converting may comprise redetermining the one or more of the operational parameter limits applied in the converting on the basis of the collected data such that an estimated lifetime of the inverter 10 or a part thereof remains within a predetermined range while e.g. the output power of the inverter is maximized. In other words, the adapting of the one or more of the set operational parameter limits may be performed by utilizing any suitable lifetime estimation technique, based on e.g. Arrhenius law, on the basis of the collected data such that the estimated lifetime of the inverter 10 or a part thereof is kept within a predetermined range despite e.g. changes in the operational conditions related to the inverter 10. During the design of the inverter 10 some generalizations of the likely operating temperature conditions may need to be set and the expected lifetime of the inverter 10 can be calculated based on those generalizations. For example, the inverter can be expected to operate a different number of hours in different ambient temperatures and the sum of these hours may correspond to the expected lifetime of the inverter. Since the actual operation conditions of the inverter 10 might substantially differ from the generalized conditions, the resulting operation limits might not be well optimized. Therefore, by collecting data of the operational conditions, the controller 100, for instance, can determine more optimized operational parameter limit values which may result in essentially the same expected lifetime. The optimization can lead to enhanced power output (yield) due to increased efficiency or raised power levels in certain conditions, for example. In the following some possible examples of the adaptation are given.

Figure 2:
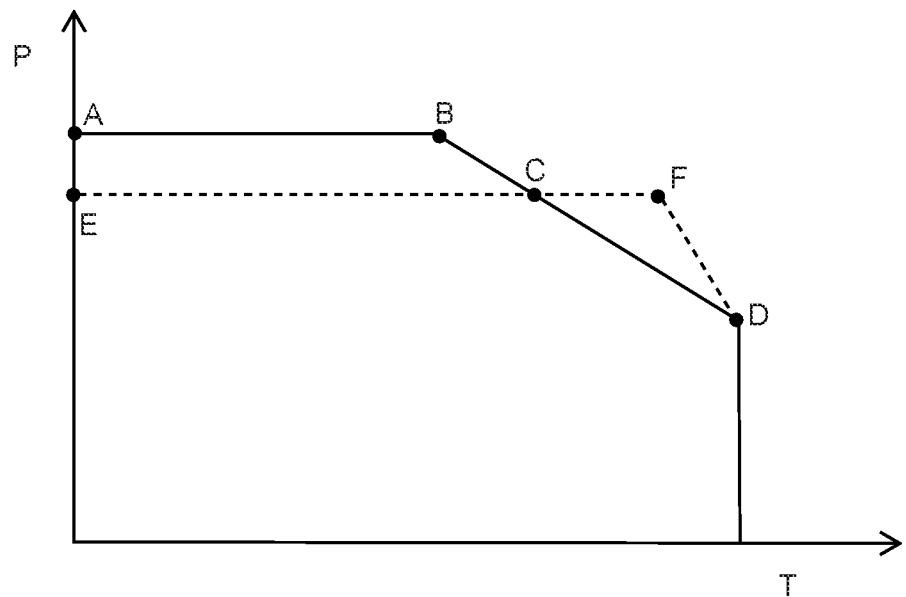
FIG. 2 illustrates a diagram according to an embodiment.

FIG. 2 shows an example of a power (or current) vs. temperature diagram of an inverter. The power P may be the output power of the inverter and the temperature T may be the ambient temperature of the inverter. The solid line A-B-C-D in the diagram of FIG. 2 is a basic output power (or current) of the inverter vs. the ambient temperature of the inverter curve. The inverter is allowed to operate at any point within the area limited by the solid line curve continuously and will then reach its estimated lifetime. Thus, the solid line curve represents set operational parameter limits. If it is determined based on collected data in a particular installation, for example, that the power available from the DC power source 20 between points A and C is constantly below the solid line, e.g. on the level of the dashed line between points E and C, or even below that, then the inverter 10 could operate at a higher power at higher temperatures, i.e. instead of the solid line between points C and D, the inverter 10 could operate according to the dashed line between points C, F and D while the lifetime of the inverter 10 would remain essentially the same. The dashed line representing adapted operational parameter limits can be calculated from the collected data.

Figure 3:
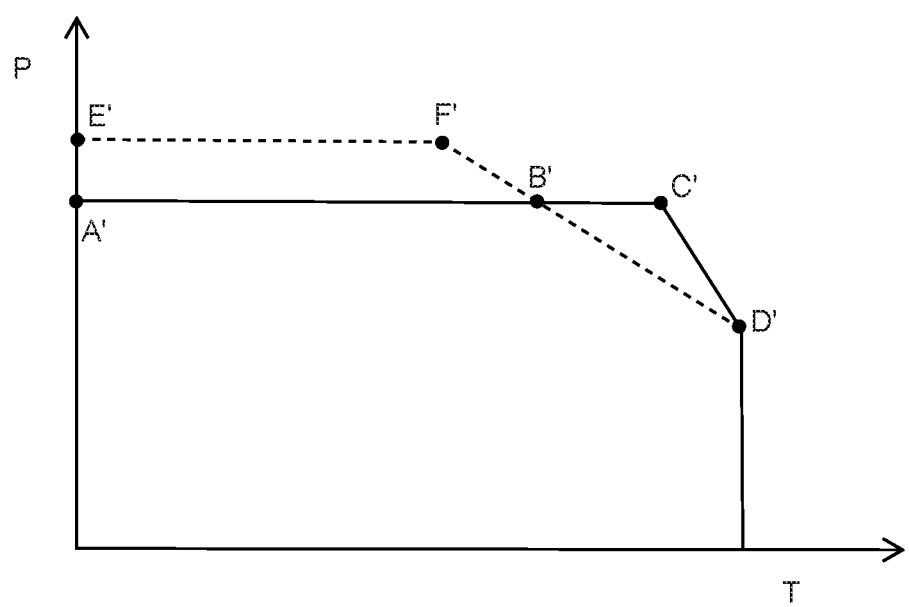
FIG. 3 illustrates a diagram according to an embodiment.

FIG. 3 shows another example of a power (or current) vs. temperature diagram of an inverter. The power P may again be the output power of the inverter and the temperature T may be the ambient temperature of the inverter. The solid line A'-B'-C'-D' in the diagram of FIG. 3 is the basic output power (or current) of the inverter vs. the ambient temperature of the inverter curve. Now if based on collected data it is determined that the power available from the DC power source 20 between points B', C' and D' is constantly below the solid line, e.g. on the level of the dashed line between points B' and D', or even below that, then the inverter 10 could operate at a higher power at lower temperatures. Then, instead of the solid line between points A' and B', the inverter 10 could operate according to the dashed line between points E', F' and B' while the lifetime of the inverter 10 would remain essentially the same. The dashed line E'-F'-D' representing adapted operational parameter limits can be calculated from the collected data.

Figure 4:
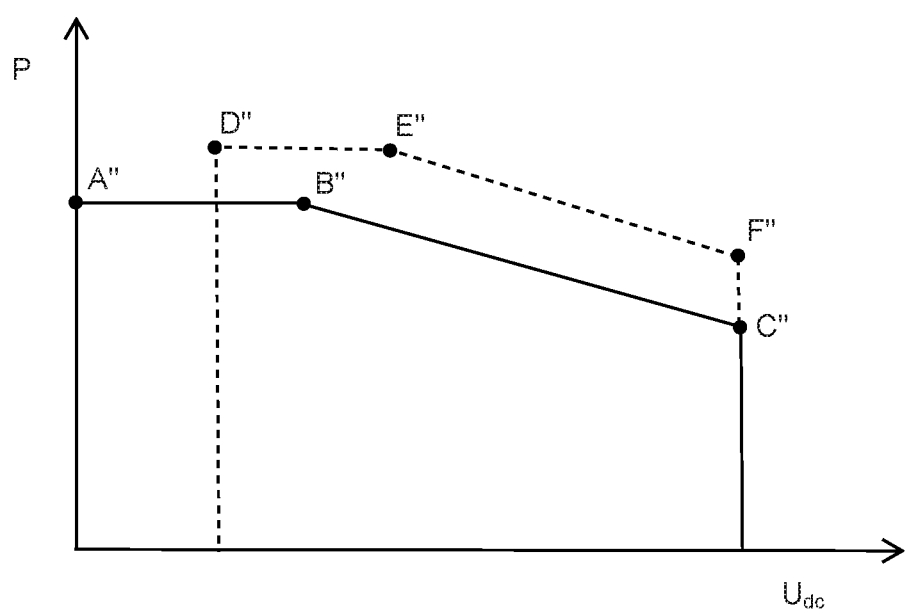
FIG. 4 illustrates a diagram according to an embodiment.

FIG. 4 shows an example of an output power vs. input voltage diagram of an inverter. The solid line A"-B"-C" in the diagram of FIG. 4 represents set operational parameter limits and the inverter is allowed to operate at any point within the area limited by the solid line curve continuously and will then reach its estimated lifetime. If the voltage from the DC power source 20 does not go down to the minimum, the inverter 10 does not operate in an optimal way and the performance is limited by the solid line. It may be that during most or at least many days the DC voltage from the DC power source 20 never reaches the minimum, e.g. 850 V, but goes down only to e.g. 930 V. In that case the inverter 10 could operate with higher power than what is allowed by the solid line. Thus, if it is determined based on collected data that the input voltage $U_{dc}$ of the inverter is constantly above the level corresponding to point D", then the inverter 10 could operate at a higher power. Then, instead of the solid line between points A", B" and C", the inverter 10 could operate according to the dashed line between points D", E" and F" while the lifetime of the inverter 10 would remain essentially the same. In this case the AC output voltage of the inverter may be adjusted to a higher value by changing tapping setting of the output transformer 50, for example. Changing the tapping setting to a value which leads to the inverter 10 to operate at a near optimal DC to AC voltage ratio ($U_{dc,minimum}=1.42 \times U_{ac}$), for instance, enhances the efficiency of the inverter, especially in the case of a single stage inverter, and also enhances the expected lifetime of the inverter 10 as the heat dissipation within the inverter is reduced due to the AC voltage raise. The dashed line D"-E"-F" representing adapted operational parameter limits can be calculated from the collected data. According to an embodiment, the control arrangement 100 may signal the user or operator of the system (e.g. via a fieldbus or the like) to change the tapping of the output transformer 50 in order to optimize the efficiency and or lifetime of the system based on the collected operational data. According to an embodiment, the control arrangement 100 may also directly control a tap changer 60 of the output transformer 50 to change the tapping thereof.

According to an embodiment, the collecting of said data of operational conditions related to the inverter 10 may be performed essentially continuously prior to performing said determining for the first time and/or between subsequent determinations. Accordingly, when the determining is performed at predetermined time intervals, for example, the length of a time period(s) of the data collection prior to the first determining (and the possibly resulting optimization of the operational parameter limits) and/or between subsequent determinations may correspond to such predetermined time interval(s). According to an embodiment, such predetermined time interval(s) may be a value which represents typical operational conditions of the system, such as one or more days, weeks, months or years. As an example, in some locations the operational conditions of the system may vary very little and/or rarely during a time period, such as a year, and in such locations can the predetermined time interval be set to a month for example. In other locations the operational conditions may vary substantially and/or often during a time period, such as a year, and in such locations can the predetermined time interval be set to one year, for example. The predetermined time interval value can be a parameter value within software of the control arrangement 100, for example, which parameter value can be adjustable by the user or operator of the system to best fit to the prevailing operational conditions of the system.

According to an embodiment, the determining whether the set operational parameter limits can be optimized can be performed in response to one or more of the operational parameter values reaching or exceeding the corresponding limit values. Such a time instance can occur, for example, when the inverter 10 starts limiting its output power due to a current/internal temperature/DC voltage reaching or exceeding the corresponding limit value. For example, if the temperature of one or more AC components (e.g. an AC contactor or the like) of the system reaches or exceeds a corresponding temperature limit, it can be determined if the system could be optimized by raising the AC voltage level by changing the output transformer 50 voltage tapping, for example. In such case it may be determined based on the collected data that the minimum DC voltage value during the data collection period has been higher than the minimum DC voltage that would result after a possible change of the output transformer 50 tapping setting. For example, if the minimum DC voltage value during a one year period of data collection had been 600 V, and the AC voltage setting of a three phase output transformer would have been on the level of 400 V (line to line), and if the output transformer 50 had tapping setting values of +−2×2.5%, it would be possible to determine and implement, or signal to the user, that the tapping setting of the transformer 50 could be changed to +2×2.5% (resulting to a rectified DC voltage value of 1.05×400×1.41=592.2 V). This kind of exemplary tapping setting change would improve the efficiency of the inverter and enable the inverter to output more power as the current level at the AC circuit of the system would be lowered, and thus the temperature of the limiting AC component would be reduced.

The control arrangement 100 or other means controlling the inverter according to any one of the embodiments herein, or a combination thereof, may be implemented as one physical unit or as two or more separate physical units that are configured to implement the functionality of the various embodiments. Herein the term 'unit' generally refers to a physical or logical entity, such as a physical device or a part thereof or a software routine. The control arrangement 100 according to any one of the embodiments may be implemented at least partly by means of one or more computers or corresponding digital signal processing (DSP) equipment provided with suitable software, for example. Such a computer or digital signal processing equipment preferably comprises at least a working memory (RAM) providing storage area for arithmetical operations, and a central processing unit (CPU), such as a general-purpose digital signal processor. The CPU may comprise a set of registers, an arithmetic logic unit, and a control unit. The CPU control unit is controlled by a sequence of program instructions transferred to the CPU from the RAM. The CPU control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the invention, or a part thereof, may further comprise suitable input means for receiving e.g. measurement and/or control data, and output means for outputting e.g. control or other data. It is also possible to use a specific integrated circuit or circuits, or discrete electric components and devices for implementing the functionality according to any one of the embodiments.

The invention may be implemented in existing electric system components such as inverters. Present inverters may comprise processors and memory that may be utilized in the functions according to the various embodiments described herein. Thus, all modifications and configurations required for implementing an embodiment in existing electric system components, such as inverters may be performed as software routines, which may be implemented as added or updated software routines. If at least part of the functionality of the invention is implemented by software, such software may be provided as a computer program product comprising computer program code which, when run on a computer, causes the computer or corresponding arrangement to perform the functionality according to the embodiments as described herein. Such a computer program code may be stored or generally embodied on a computer readable medium, such as suitable memory, e.g. a flash memory or an optical memory, from which it is loadable to the unit or units executing the program code. In addition, such a computer program code implementing the invention may be loaded to the unit or units executing the computer program code via a suitable data network, for example, and it may replace or update a possibly existing program code.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method for operating an inverter, the method comprising:
converting with the inverter DC power supplied to a DC input of the inverter into AC power supplied from an AC output of the inverter to an AC output transformer by applying set operational parameter limits which define limits for allowed operating points of the inverter, wherein the operational parameters comprise at least an AC output voltage of the inverter;
collecting, during the converting, data of operational conditions related to the inverter;
determining on the basis of the collected data whether the set operational parameter limits can be optimized with regard to one or more optimization criteria by changing a voltage tapping setting of the AC output transformer, wherein the one or more optimization criteria comprises an estimated lifetime of the inverter or a part thereof; and
in response to determining that the set operational parameter limits can be optimized, changing the voltage tapping setting of the AC output transformer and adapting one or more of the set operational parameter limits including at least limits for the AC output voltage of the inverter applied in the converting on the basis of the collected data.

2. The method of claim 1, wherein the operational parameters further comprise at least one voltage parameter and/or at least one current parameter and/or at least one power parameter and/or at least one temperature parameter.

3. The method of claim 1, wherein the operational conditions related to the inverter comprise at least one internal condition of the inverter and/or at least one external condition of the inverter.

4. The method of claim 1, wherein the determining is performed at predetermined time intervals and/or in response to one or more of the operational conditions related to the inverter changing beyond predetermined limits and/or in response to receiving a command.

5. The method of claim 1, wherein the one or more optimization criteria further comprises at least one of an efficiency of the inverter, a power of the inverter, and/or an energy output of the inverter.

6. The method of claim 1, wherein the collecting of the data of the operational conditions related to the inverter comprises measuring the data and/or receiving the data.

7. The method of claim 1, wherein the DC power is supplied by a DC power source comprising one or more photovoltaic panels.

8. A computer program product comprising:
a computer program code embodied on a non-transitory computer readable medium, wherein execution of the program code in a computer causes the computer to:
convert with an inverter DC power supplied to a DC input of the inverter into AC power supplied from an AC output of the inverter to an AC output transformer by applying set operational parameter limits which define limits for allowed operating points of the inverter, wherein the operational parameters comprise at least an AC output voltage of the inverter;

collect, during the converting, data of operational conditions related to the inverter;

determine on the basis of the collected data whether the set operational parameter limits can be optimized with regard to one or more optimization criteria by changing a voltage tapping setting of the AC output transformer, wherein the one or more optimization criteria comprises an estimated lifetime of the inverter or a part thereof; and in response to determining that the set operational parameter limits can be optimized, change the voltage tapping setting of the AC output transformer and adapt one or more of the set operational parameter limits including at least limits for the AC output voltage of the inverter applied in the converting on the basis of the collected data.

9. An inverter arrangement comprising:
an inverter with a DC input and an AC output; and
control means configured to:
control the inverter to convert DC power supplied to the DC input of the inverter into AC power supplied from the AC output of the inverter to an AC output transformer by applying operational parameter limits which define limits for allowed operating points of the inverter, wherein the operational parameters comprise at least an AC output voltage of the inverter;

collect, during the converting, data of operational conditions related to the inverter;

determine on the basis of the collected data whether the set operational parameter limits can be optimized with regard to one or more optimization criteria by changing a voltage tapping setting of the AC output transformer, wherein the one or more optimization criteria comprises an estimated lifetime of the inverter or a part thereof; and in response to determining that the set operational parameter limits can be optimized, change the voltage tapping setting of the AC output transformer and adapt one or more of the set operational parameter limits including at least limits for the AC output voltage of the inverter applied in the converting on the basis of the collected data.

10. The inverter arrangement of claim 9, wherein the operational parameters further comprise at least one voltage parameter and/or at least one current parameter and/or at least one power parameter and/or at least one temperature parameter.

11. The inverter arrangement of claim 9, wherein the operational conditions related to the inverter comprise at least one internal condition of the inverter and/or at least one external condition of the inverter.

12. The inverter arrangement of claim 9, wherein the control means are configured to perform the determining at predetermined time intervals and/or in response to one or more of the operational conditions related to the inverter changing beyond predetermined limits and/or in response to receiving a command.

13. The inverter arrangement of claim 9, wherein the one or more optimization criteria further comprises at least one of an efficiency of the inverter, a power of the inverter, and/or an energy output of the inverter.

14. The inverter arrangement of claim 9, wherein the control means are configured to collect the data of the operational conditions related to the inverter by measuring the data and/or by receiving the data.

15. An electric system comprising:
an inverter with a DC input and an AC output;
an AC output transformer; and
control means configured to:
control the inverter to convert DC power supplied to the DC input of the inverter into AC power supplied from the AC output of the inverter to the AC output transformer by applying operational parameter limits which define limits for allowed operating points of the inverter, wherein the operational parameters comprise at least an AC output voltage of the inverter;

collect, during the converting, data of operational conditions related to the inverter;

determine on the basis of the collected data whether the set operational parameter limits can be optimized with regard to one or more optimization criteria by changing a voltage tapping setting of the AC output transformer, wherein the one or more optimization criteria comprises an estimated lifetime of the inverter or a part thereof;

in response to determining that the set operational parameter limits can be optimized, change the voltage tapping setting of the AC output transformer and adapt one or more of the set operational parameter limits including at least limits for the AC output voltage of the inverter applied in the converting on the basis of the collected data; and a DC power source connected to the DC input of the inverter, wherein the DC power source comprises one or more photovoltaic panels.

16. An apparatus comprising:
an inverter with a DC input and an AC output;
a processor; and
a memory storing instructions that, when executed by the processor, cause the apparatus to:
convert DC power supplied to the DC input of the inverter into AC power supplied from the AC output of the inverter to an AC output transformer by applying operational parameter limits which define limits for allowed operating points of the inverter, wherein the operational parameters comprise at least an AC output voltage of the inverter;

collect, during the converting, data of operational conditions related to the inverter;

determine on the basis of the collected data whether the set operational parameter limits can be optimized with regard to one or more optimization criteria by changing a voltage tapping setting of the AC output transformer, wherein the one or more optimization criteria comprises an estimated lifetime of the inverter or a part thereof; and in response to determining that the set operational parameter limits can be optimized, change the voltage tapping setting of the AC output transformer and adapt one or more of the set operational parameter limits including at least limits for the AC output voltage of the inverter applied in the converting on the basis of the collected data.

* * * * *